(12) United States Patent
Vajravel et al.

(10) Patent No.: US 12,222,905 B2
(45) Date of Patent: Feb. 11, 2025

(54) BRIDGING HETEROGENEOUS SETS OF CLOUD APPLICATIONS AND STORAGE

(71) Applicant: Dell Products L.P., Round Rock, TX (US)

(72) Inventors: Gokul Thiruchengode Vajravel, Bangalore (IN); Srinivasa Ragavan Rajagopalan, Bangalore (IN); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/183,313

(22) Filed: Mar. 14, 2023

(65) Prior Publication Data

US 2024/0311343 A1    Sep. 19, 2024

(51) Int. Cl.
*G06F 16/182* (2019.01)
(52) U.S. Cl.
CPC .................. *G06F 16/183* (2019.01)
(58) Field of Classification Search
CPC .................................................. G06F 16/183
See application file for complete search history.

(56) References Cited

U.S. PATENT DOCUMENTS

| 9,336,209 | B1 * | 5/2016 | Gupta | G06Q 10/101 |
| 2018/0124068 | A1 * | 5/2018 | Ruhlen | H04L 67/60 |
| 2018/0218006 | A1 * | 8/2018 | Palmer | G06F 16/93 |

OTHER PUBLICATIONS

Tom Jebo: "WOPI Protocol Overview", Microsoft, 2019 (Year: 2019).*
Jebo, Tom, WOPI Protocol Overview, PDF, DevDays Asia 2019, Microsoft, https://interopevents.blob.core.windows.net/events/2019/Taiepi/docs/WOPI Protocol Overview.pdf, last accessed on Mar. 1, 2023.

* cited by examiner

*Primary Examiner* — Kuen S Lu
(74) *Attorney, Agent, or Firm* — Kirton McConkie; Brian Tucker

(57) ABSTRACT

Heterogeneous sets of cloud applications and storage can be bridged. Cloud services can be configured to include a Web Application Open Platform Interface (WOPI) abstractor, multiple WOPI servers corresponding to respective multiple WOPI clients of cloud applications that may be used to access files, and a cloud storage abstractor that functions as an intermediary between the multiple WOPI servers and multiple cloud storages in which the files may be stored. The cloud services allow a user to access a single webpage or other interface to obtain access to his or her files stored in the multiple cloud storages via any of the multiple cloud applications.

20 Claims, 10 Drawing Sheets

BRIDGING HETEROGENEOUS SETS OF CLOUD APPLICATIONS AND STORAGE

CROSS-REFERENCE TO RELATED APPLICATIONS

N/A

BACKGROUND

It has become common, particularly in work environments, to use cloud storage and cloud applications to store and access files. For example, a company may subscribe to OneDrive, Google Drive, Box, and/or other cloud storage to allow its employees to store their files in the cloud and may subscribe to Microsoft 365, Google Workspace, and/or other cloud applications to allow the employees to access create, edit, read, or otherwise access such files.

If the same provider's cloud applications and storage are used (e.g., Microsoft 365 and OneDrive), the user will be able to seamlessly open files (i.e., a provider's cloud applications are configured by default to work seamlessly with its cloud storage). However, it is common to use cloud storage and cloud applications from different providers (e.g., using Microsoft 365 to access files stored in Google Drive). To facilitate these cross-provider scenarios, the Web App Open Platform Interface (WOPI) protocol has been developed.

The WOPI protocol identifies a set of operations that enables a WOPI client to access and change files stored by a WOPI server. In WOPI terminology and in the context of this specification, a WOPI client is specific to the cloud application (e.g., the Word web app that is part of Microsoft 365) and a WOPI server is specific to the cloud storage (e.g., Google Drive in which a .docx file may be stored). By implementing the WOPI protocol, the WOPI client can obtain the necessary information from the WOPI server to present a file to a user (e.g., via a browser-based viewer such as an iframe by which the user accesses the Word web app) and to allow the user's interactions with the file to be persisted back to the WOPI server.

Although the WOPI protocol provides a way to bridge between different providers of cloud storage and cloud applications, it can be burdensome and complicated to successfully implement the WOPI protocol. For example, FIG. 1 represents a scenario where an enterprise uses multiple cloud storages 120-1 through 120-n and multiple cloud applications 110-1 through 110-n. In such a scenario, if the enterprise wants its users of user devices 130-1 through 130-n to be able to open any file stored in any of cloud storages 120-1 through 120-n in any of cloud applications 110-1 through 110-n, the enterprise will be tasked with developing and maintaining services for implementing the WOPI protocol on a per cloud storage and per cloud application basis. In other words, if a company uses m cloud storages and n cloud applications, it will be necessary to implement m×n "bridge services." In this context, a bridge service can be considered as the combination of the WOPI client and the WOPI server that allow a particular cloud application to access files in a particular cloud storage (i.e., there is a one-to-one relationship between a WOPI client and a WOPI server). Accordingly, a scale problem exists with traditional techniques for implementing the WOPI protocol in a multiple cloud storage and/or multiple cloud application environment.

BRIEF SUMMARY

The present invention extends to systems, methods, and computer program products for bridging heterogeneous sets of cloud applications and storage. Cloud services can be configured to include a Web Application Open Platform Interface (WOPI) abstractor, multiple WOPI servers corresponding to respective multiple WOPI clients of cloud applications that may be used to access files, and a cloud storage abstractor that functions as an intermediary between the multiple WOPI servers and multiple cloud storages in which the files may be stored. The cloud services allow a user to access a single webpage or other interface to obtain access to his or her files stored in the multiple cloud storages via any of the multiple cloud applications.

In some embodiments, the present invention may be implemented as a method for bridging heterogeneous sets of cloud applications and storage. A WOPI abstractor can receive a request from a user device of a user to view the user's files that are stored in multiple cloud storages. The request can be routed to a first WOPI server that corresponds with a first WOPI client of a first cloud application. The first WOPI server can retrieve, via a cloud storage abstractor, a list of the user's files that are stored in the multiple cloud storages. The WOPI abstractor can receive the list of the user's files from the first WOPI server and then cause the list of the user's files to be presented to the user via the user device.

In some embodiments, the present invention may be implemented as computer storage media storing computer executable instructions which when executed implement cloud services. The cloud services can include a WOPI abstractor that provides an interface by which a user accesses files stored in multiple cloud storages, multiple WOPI servers corresponding to respective multiple cloud applications that the user can use to access the files, and a cloud storage abstractor that functions as an intermediary between the multiple WOPI servers and the multiple cloud storages.

In some embodiments, the present invention may be implemented as computer storage media storing computer executable instructions which when executed implement a method for bridging heterogeneous sets of cloud applications and storage. A WOPI abstractor can receive a request from a user device of a user to view the user's files that are stored in multiple cloud storages. The request can be routed to a first WOPI server that corresponds with a first WOPI client of a first cloud application. The first WOPI server can retrieve, via a cloud storage abstractor, a list of the user's files that are stored in the multiple cloud storages. The WOPI abstractor can receive the list of the user's files from the first WOPI server and then cause the list of the user's files to be presented to the user via the user device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
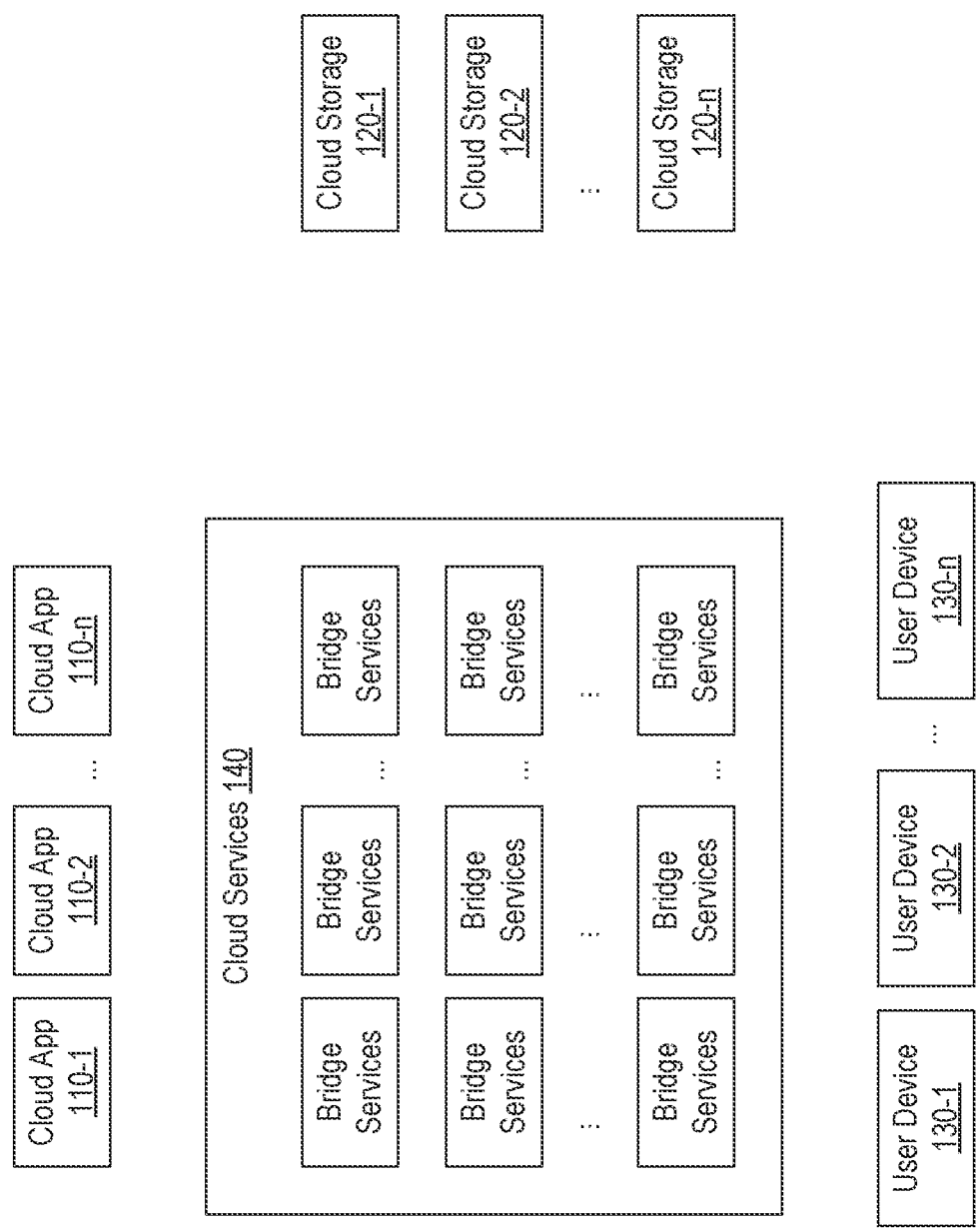
FIG. 1 illustrates a prior art approach to using the WOPI protocol to allow files in multiple clouds storages to be accessible via multiple cloud applications.
Figure 2:
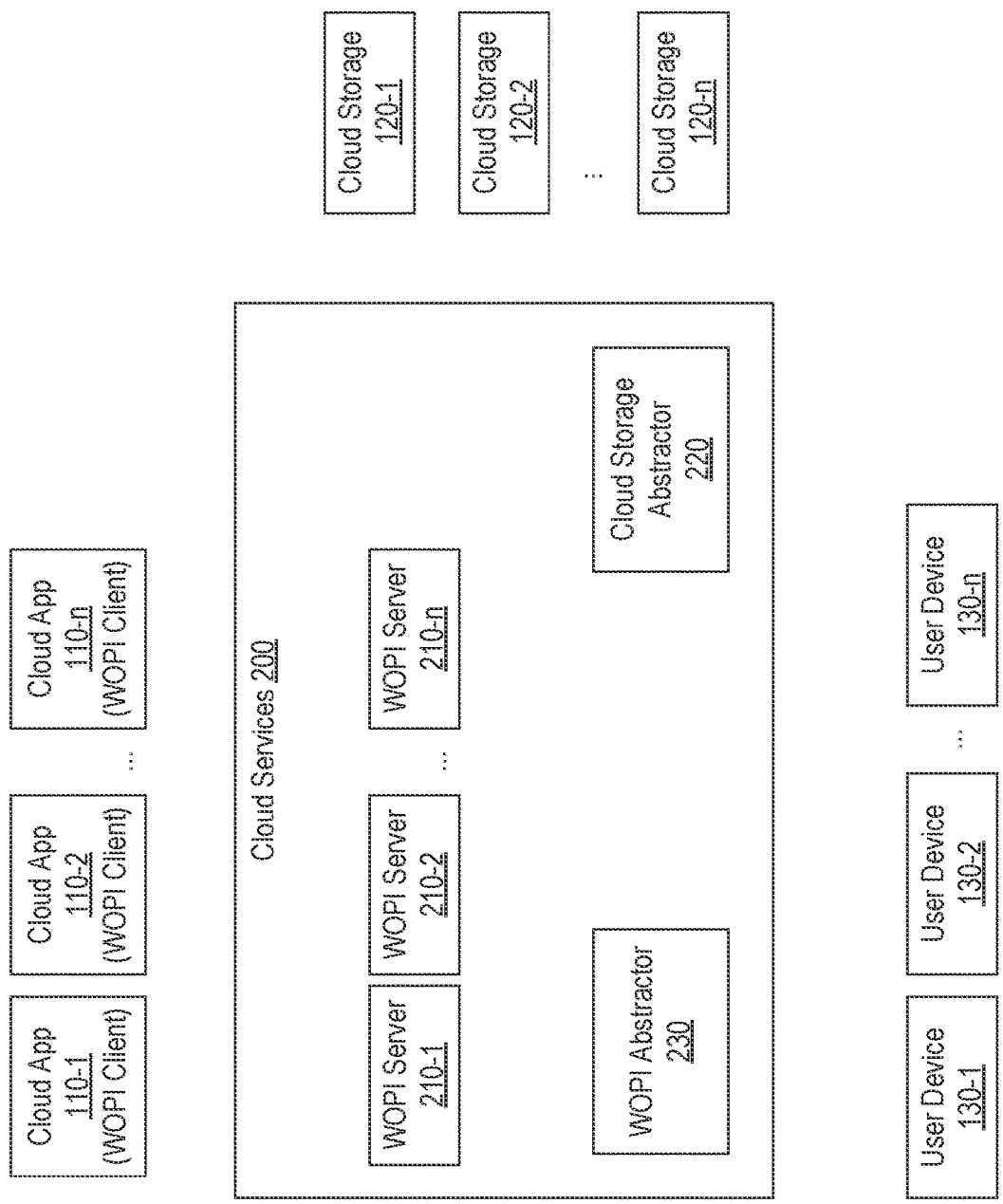
FIG. 2 provides an example of a computing environment in which embodiments of the present invention may be implemented.

FIG. 2 provides an example of a computing environment in which embodiments of the present invention may be implemented. Similar to FIG. 1, FIG. 2 includes cloud applications 110-1 through 110-*n* (collectively or generally cloud application(s) 110), cloud storages 120-1 through 120-*n* (collectively or generally cloud storage(s) 120) and user devices 130-1 through 130-*n* (collectively or generally user device(s) 130). Notably, any number of cloud applications or cloud storages could be used when embodiments of the present invention are implemented. User devices 130 could include a browser or dedicated application which provides an interface for accessing cloud applications 110.

FIG. 2 also includes cloud services 200 which can generally represent components that an enterprise (or other entity) could implement/maintain to bridge heterogeneous sets of cloud applications 110 and cloud storages 120. Cloud services 200 can include a WOPI server 210-1 through 210-*n* (collectively or generally WOPI server(s) 210) for each of cloud applications 110-1 through 110-*n* respectively, a WOPI abstractor 230 and a cloud storage abstractor 220.

As an overview, cloud storage abstractor 220 functions to abstract cloud storages 120 from WOPI servers 210. Cloud storage abstractor 220 can be configured to route requests to the appropriate cloud storage 120. Each WOPI server 210 can be configured to point to cloud storage abstractor 220 as the storage location for any file in any of cloud storages 120. WOPI abstractor 230 can be a user-facing service that provides the initial access point for opening files in cloud storage 120 using any of cloud applications 110 (e.g., a web app that allows the user to view files that can be opened).

Figure 3A:
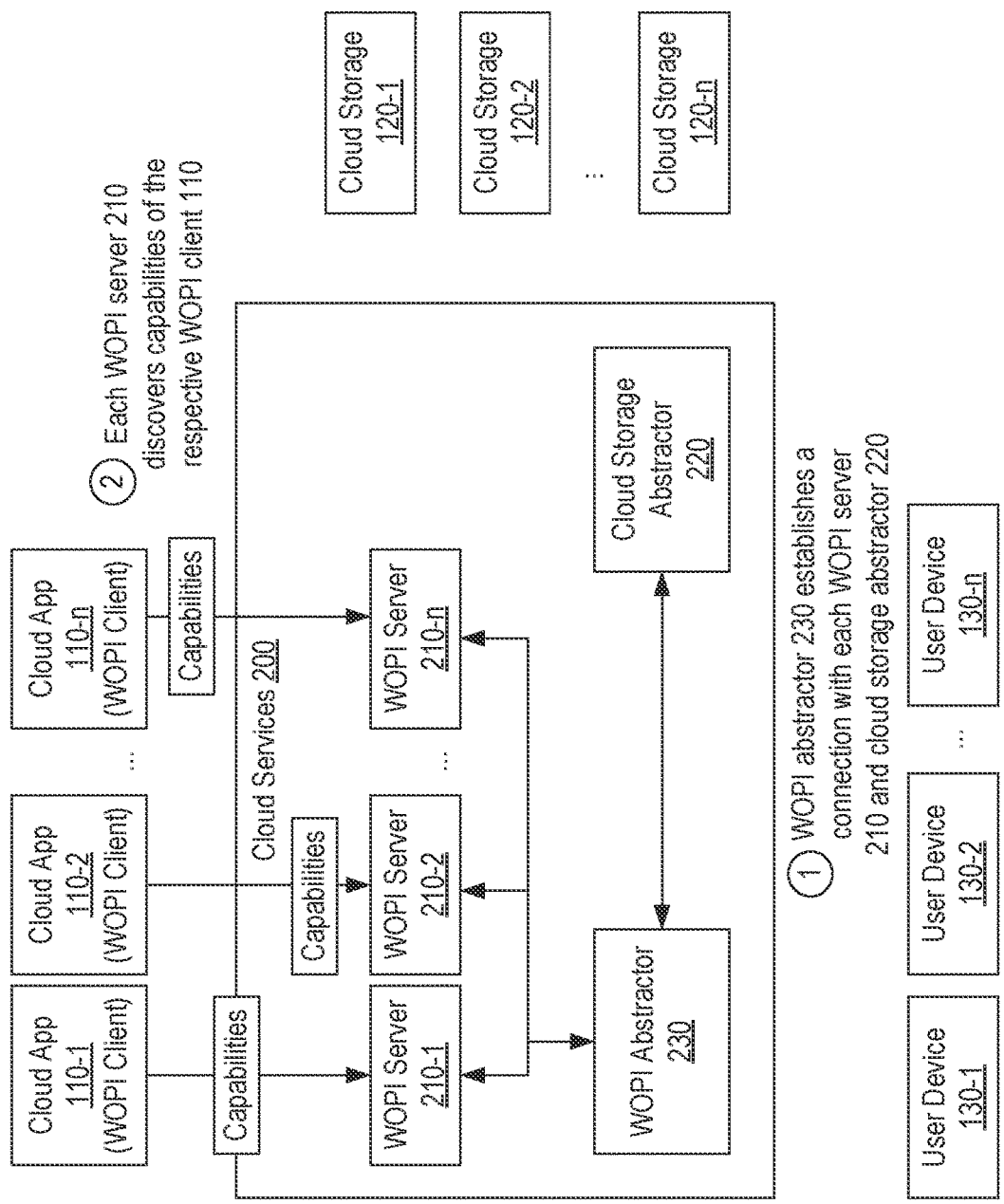
FIGS. 3A and 3B provide an example of how cloud services can be initiated to enable the bridging of heterogeneous sets of cloud applications and storage in accordance with one or more embodiments of the present invention.
Figure 3B:
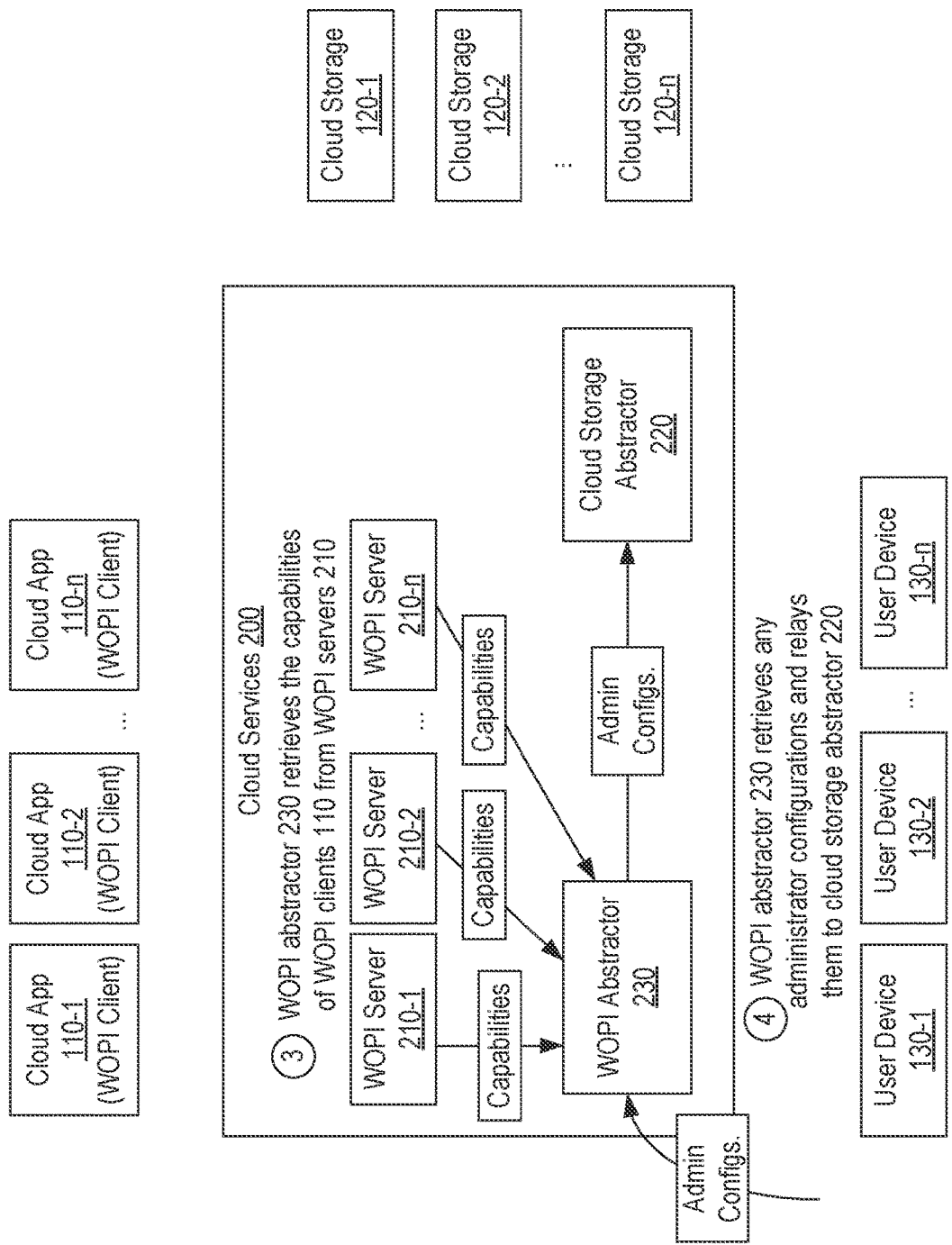

FIGS. 3A and 3B provide an example of initialization functionality that can be performed in one or more embodiments of the present invention. Turning to FIG. 3A, it can be assumed that cloud services 200 have been initialized and that, in step 1 and as part of this initialization, WOPI abstractor 230 establishes connections with each WOPI server 210 and with cloud storage abstractor 220. Also, in step 2, and as part of their initialization, each WOPI server 210 can discover capabilities of the corresponding cloud application 110 (e.g., using WOPI discovery techniques). As shown, each cloud application 110 can include or be associated with a WOPI client and cloud services 200 can include a WOPI server 210 for each cloud application 110. Accordingly, there may be a one-to-one relationship between WOPI clients and WOPI servers but the WOPI servers are not specific to any cloud storage 120. This significant simplification of the WOPI architecture is enabled by the architecture of cloud services 200 and the functionality that the components of cloud services 200 performs as described in detail below.

Turning to FIG. 3B, in step 3, WOPI abstractor 230 can retrieve the capabilities of the WOPI clients for cloud applications 110 that were collected by WOPI servers 210 and store them. In step 4, WOPI abstractor 230 may also retrieve any administrator configurations and relay them to cloud storage abstractor 220. For example, these administrator configurations could define which cloud application(s) 110 and/or cloud storage(s) 120 a particular user or group of users may use. At this point, WOPI abstractor 230 will be aware of each cloud application 110 (or more specifically, of each cloud application 110 that is available to access cloud-based files using the WOPI protocol) and can function as the users' access point for launching cloud applications 110 to access those files.

Figure 4A:
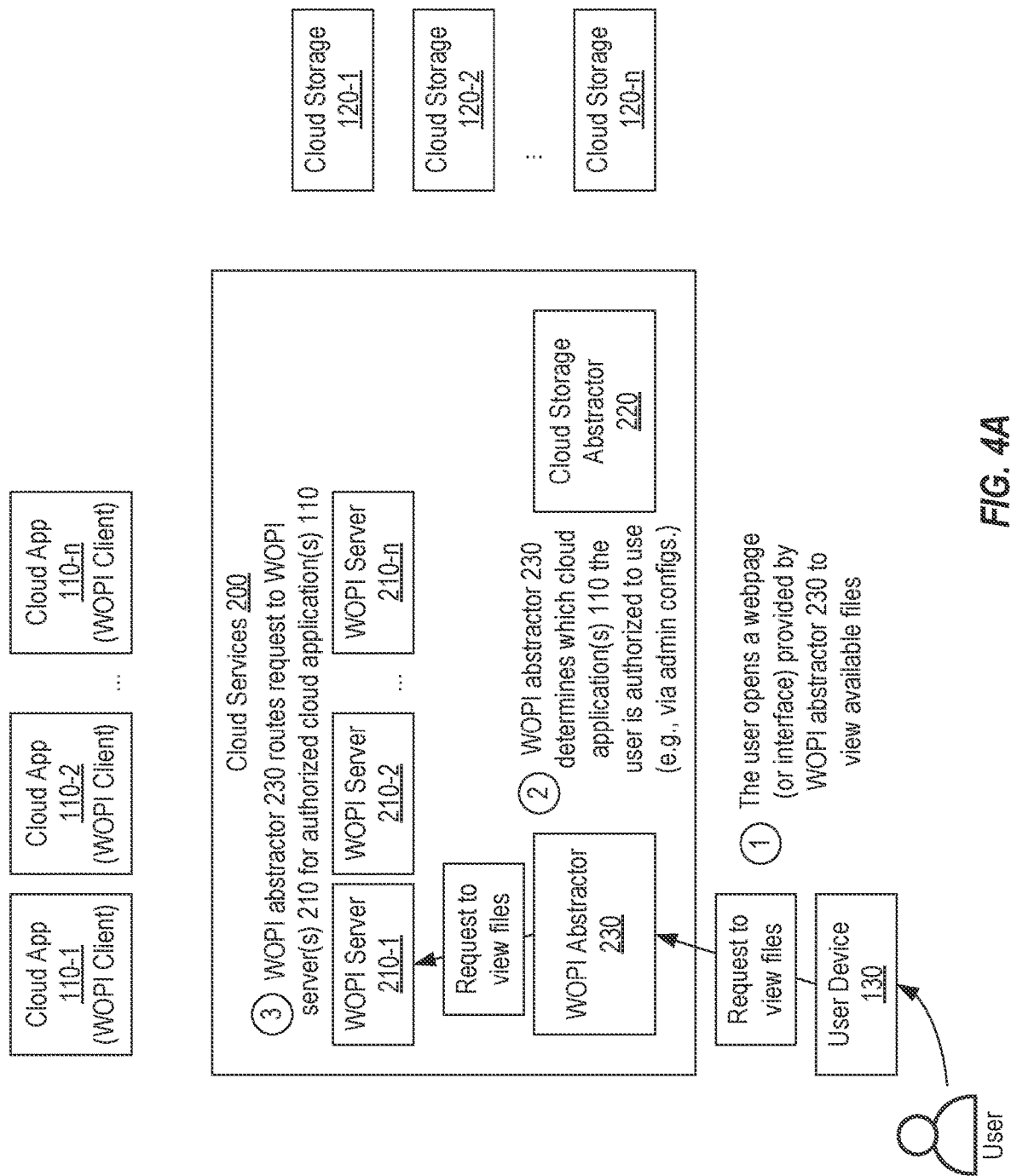
FIGS. 4A-4C provide an example of how the cloud services can obtain and present a list of a user's files that may be stored in multiple cloud storages and may be accessible via multiple cloud applications in accordance with one or more embodiments of the present invention.
Figure 4B:
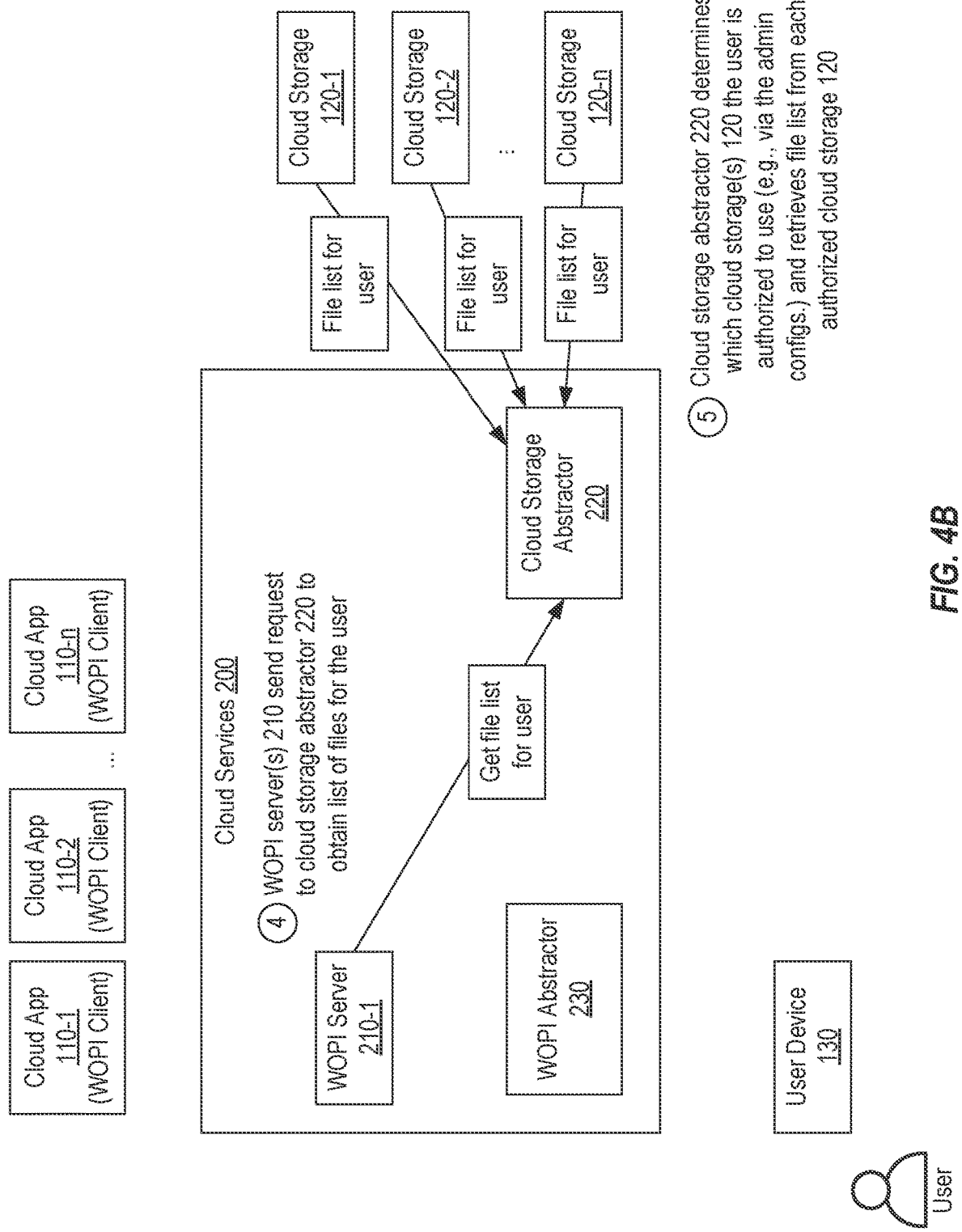
Figure 4C:
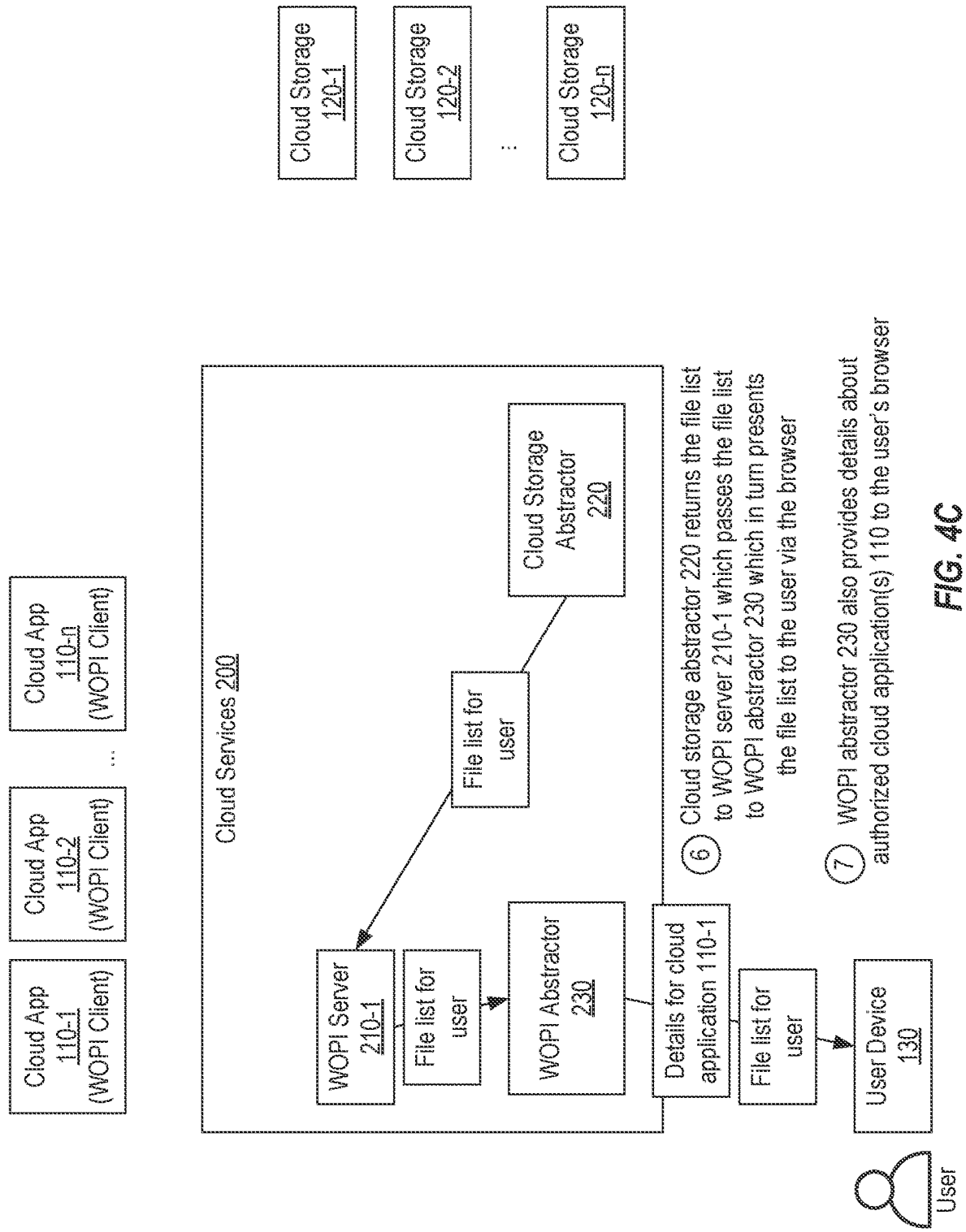

FIGS. 4A-4C provides an example of how a list of the user's files can be obtained and presented to the user in accordance with one or more embodiments of the present invention. Turning to FIG. 4A, in step 1, it is assumed that the user of user device 130 has opened a webpage (or other interface) provided by WOPI abstractor 230 to view his or her files available in cloud storage(s) 120. In other words, step 1 represents the user's attempt to view his or her files that are stored in the cloud. In step 2 and in response to the user's request to view his or her files, WOPI abstractor 230 can determine which of cloud applications 110 the user is authorized to use. For example, step 1 could cause an X-WOPI-CorrelationID request to be sent to WOPI abstractor 230 and WOPI abstractor 230 could use a string defined in this request to identify the user. WOPI abstractor 230 could then determine which cloud applications 110 the identified user is authorized to use such as by accessing the administrator configurations. For purposes of this example, it is assumed that the user is authorized to access cloud application 110-1 to which WOPI server 210-1 corresponds. Therefore, in step 3, WOPI abstractor 230 can route the request to view the files to WOPI server 210-1. If the user is authorized to use other cloud application(s) 110, in step 3, WOPI abstractor 230 could also route the request to the WOPI server(s) 210 corresponding to these other cloud application(s) 110.

Turning to FIG. 4B, in step 4, WOPI server 210-1 can send a request to cloud storage abstractor 220 to obtain a list of files for the user. In step 5, cloud storage aggregator 220 can determine which cloud storage(s) 120 the user is authorized to use (e.g., using the administrator configurations) and can then retrieve a file list from each authorized cloud storage 120. In other words, cloud storage abstractor 220 can communicate with each cloud storage 120 that the user uses to identify each of the user's files.

Turning to FIG. 4C, in step 6, cloud storage abstractor 220 returns the file list for the user to WOPI server 210-1. WOPI server 210-1 can then route the file list to WOPI abstractor 230 which in turn can present the file list to the user in the browser (or other interface) on user device 130. Accordingly, as a result of step 6, the user will see an aggregated list of his or her files. Additionally, in step 7, which can be part of step 6, WOPI abstractor 230 can provide details about cloud application 110-1 (and any other authorized cloud application 110) to the user's browser. At this point, the user's browser will know which files the user has access to regardless of where they are stored and will have sufficient detail about each cloud application 110 that the user is authorized to use so that the user's browser can request that any of the files be opened in the authorized cloud application(s).

Figure 5A:
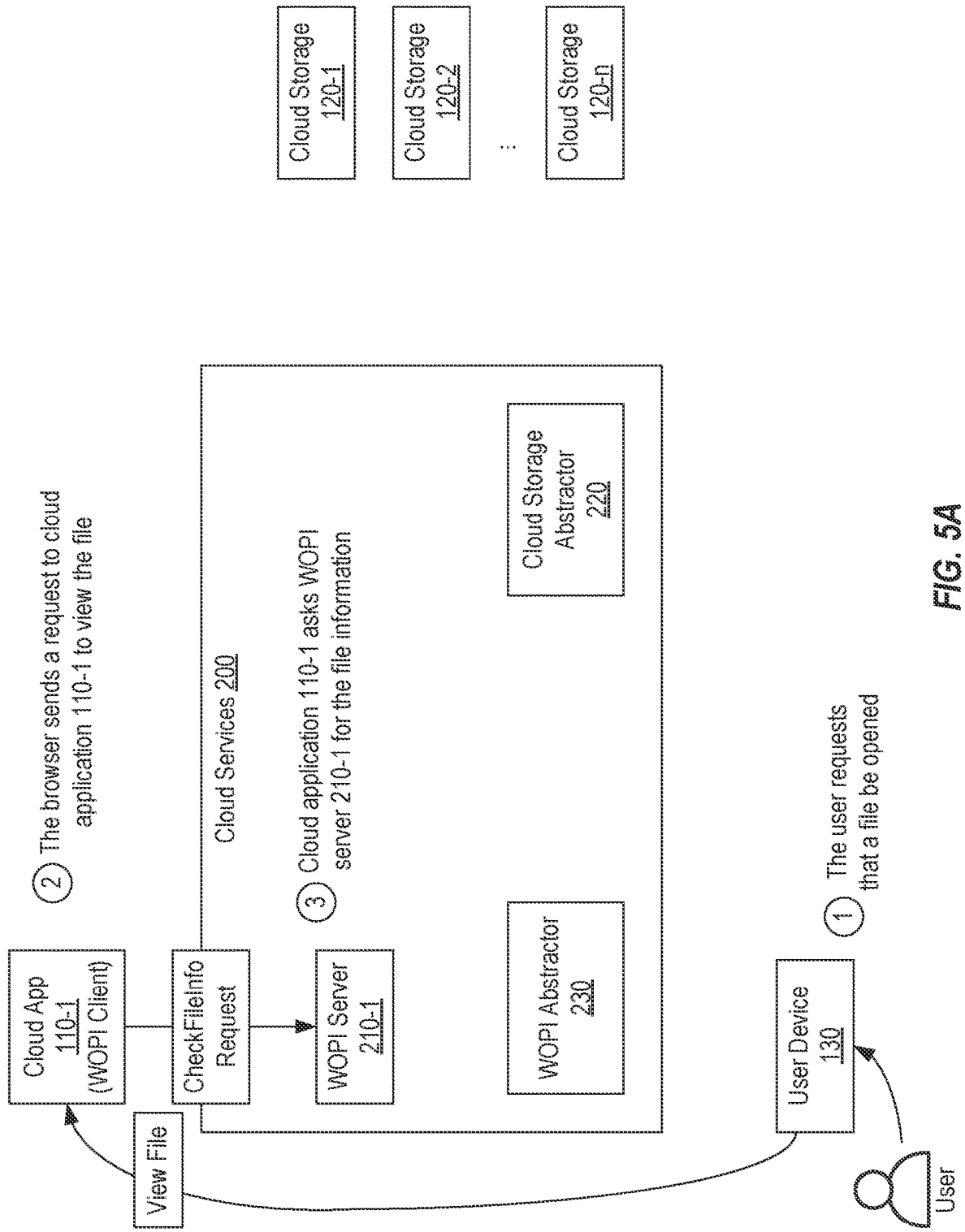
FIGS. 5A-5C provide an example of how the cloud services can allow a user to access a file in accordance with one or more embodiments of the present invention.
Figure 5B:
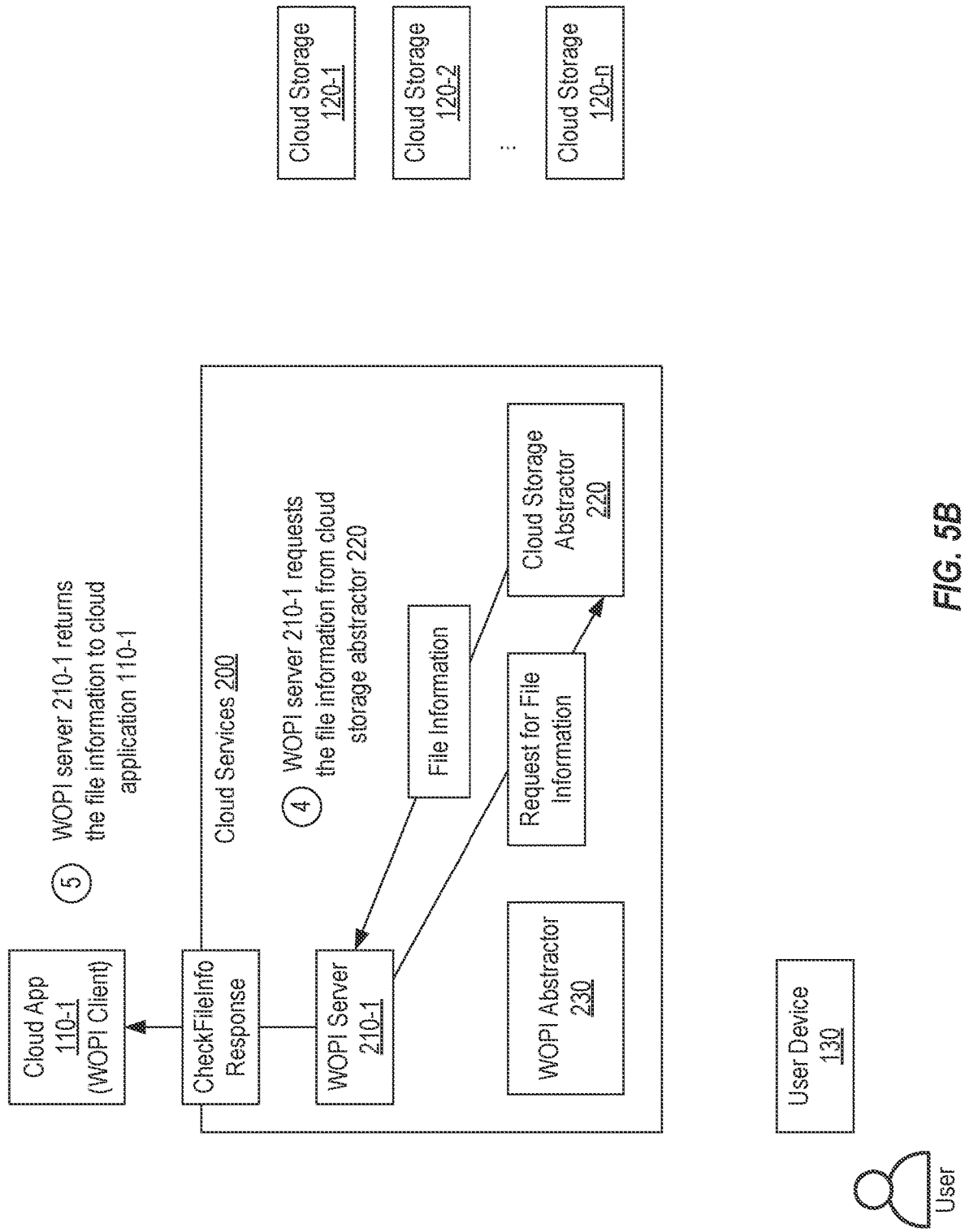
Figure 5C:
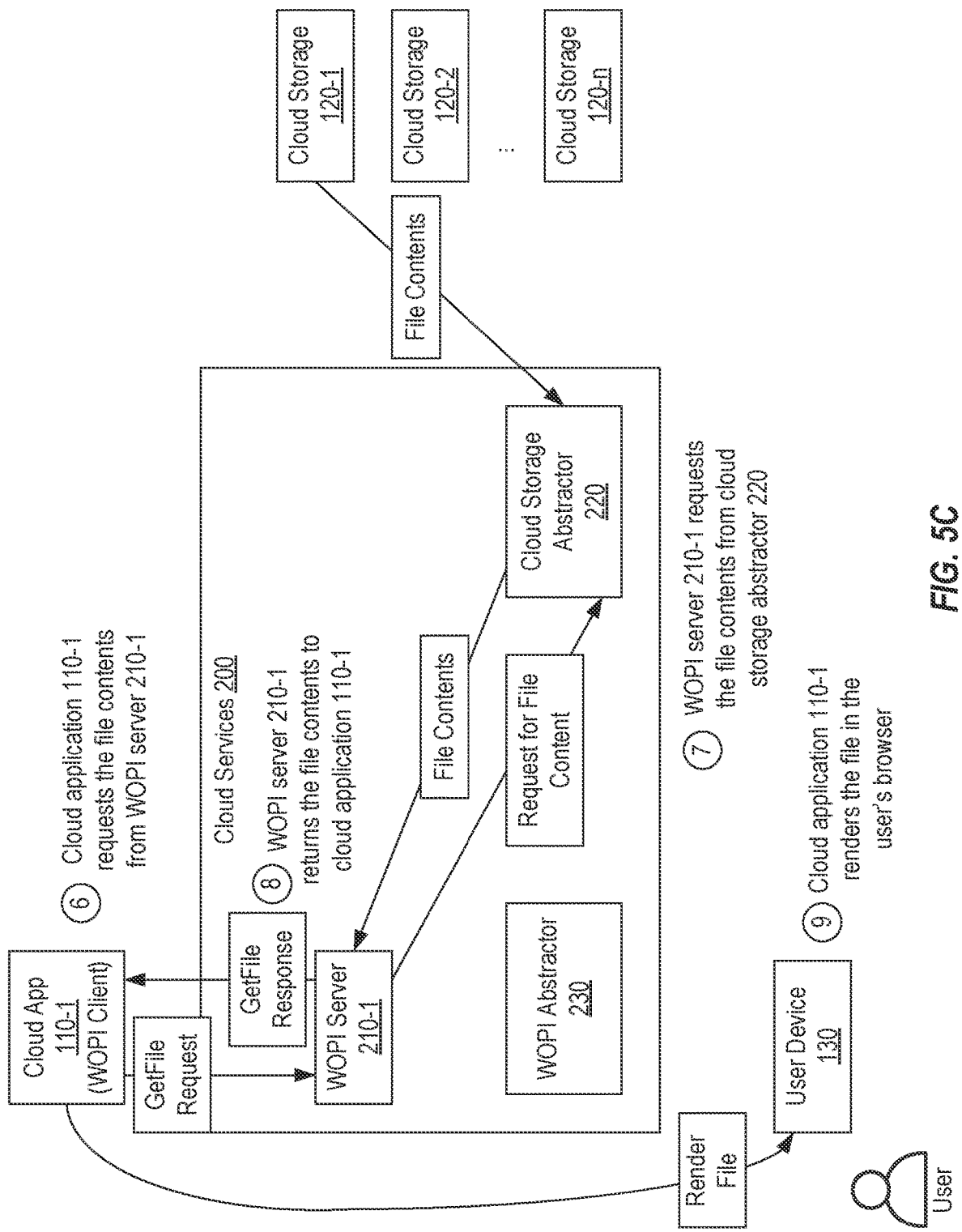

FIGS. 5A-5C provide an example of how a file can be accessed in accordance with one or more embodiments of the present invention. Turning to FIG. 5A, in step 1, it is assumed that the user requests that a file be opened such as by selecting the file in the browser displayed on user device 130. In step 2 and in response to the user selecting the file, the browser can send a request to cloud application 110-1 to view the file. Because of steps 6 and 7 in FIG. 4C, the browser will know that the file is to be opened by cloud application 110-1 and will have an identifier of the file that can be included in the request. In step 3, cloud application 110-1, as a WOPI client and using the information specified in the request, can send a request to WOPI server 210-1 for the file information. For example, this request can be in the form of a WOPI CheckFileInfo request. Notably, cloud application 110-1 can send this request to WOPI server 210-1 without needing to be aware of which cloud storage 120 the file is stored in.

Turning to FIG. 5B, in step 4, WOPI server 210-1 can send a request to cloud storage abstractor 220 to request the file information. Cloud storage abstractor 220 can then return the file information. This file information that cloud storage abstractor 220 returns can be the information necessary for WOPI server 210-1 to create a CheckFileInfo response such as the file location details. In some embodiments, cloud storage abstractor 220 may cache this file information and may complete step 4 using the cached information. In other embodiments, cloud storage abstractor 220 could interface with the cloud storage 120 that stores the file to obtain the file information. Also, in some embodiments and as part of step 4, WOPI server 210-1 could add/modify extended file information as part of the CheckFileInfo response (e.g., enabling/disabling print, translation, etc.). In such cases, this extended file information could be provided by cloud storage abstractor 220 (e.g., based on the administrator configurations) and/or determined independently by WOPI server 210-1 (e.g., based on context of the WOPI CheckFileInfo request). In any case, in step 5, WOPI server 210-1 can return the file information to cloud application 110-1 such as in the form of a WOPI CheckFileInfo response.

Turning to FIG. 5C, in step 6, cloud application 110-1 can request the file contents from WOPI server 210-1 such as in the form of a WOPI GetFile request. In step 7, WOPI server 210-1 can interface with cloud storage abstractor 220 to retrieve the file contents and return them to WOPI server 210-1. In some embodiments, cloud storage abstractor 220 may cache the file contents and may complete step 7 using the cached content. In other embodiments, cloud storage abstractor 220 could interface with the cloud storage 120 that stores the file to obtain the file contents. In either case and in step 8, WOPI server 210-1 can return the file contents to cloud application 110-1 such as in the form of a WOPI GetFile response. Finally, in step 9, cloud application 110-1 can use the file information and the file contents to render the file in the user's browser.

Steps similar to those represented in FIG. 5C can be performed to complete other actions on the file other on other files. For example, if the user requests creation of a new file or saves changes to an existing file, cloud application 110-1 can send a PutFile request to WOPI server 210-1. WOPI server 210-1 can then interface with cloud storage abstractor 220 to cause the file to be created/stored in the appropriate cloud storage 120. Similar functionality could also be performed for file renames (e.g., using the WOPI RenameFile request) and deletes (e.g., using the WOPI DeleteFile request).

Due to the architecture and functionality of cloud services 200, an enterprise can more easily support multiple cloud applications 110 and/or multiple cloud storages 120. For example, in a scenario where the enterprise wants to allow its users to use the Microsoft 365 and Zoho web apps for opening .docx files stored in three different cloud storages, embodiments of the present invention would allow the enterprise's administrator to only deploy two WOPI servers (one for Microsoft 365 and one for Zoho) as opposed to deploying six WOPI servers (three for Microsoft 365 and three for Zoho corresponding to the three cloud storages). Also, with embodiments of the present invention, the enterprise's administrator would need only deploy the single WOPI abstractor to provide the webpage for accessing either Microsoft or Zoho to view files in any of the cloud storages as opposed to needing to deploy separate webpages specific to each cloud application.

Also due to the architecture and functionality of cloud services, an enterprise can easily add or remove cloud applications and/or cloud storage without impacting the user's ability to access files. For example, if the enterprise adds a new cloud storage, the user would still access files in the same manner as described above even if the files happened to be stored in the newly-added cloud storage.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for bridging heterogeneous sets of cloud applications and storage, the method comprising:
    establishing, by a Web Application Open Platform Interface (WOPI) abstractor, a connection with a cloud storage abstractor and with each of a plurality of WOPI servers, wherein the WOPI servers have a one-to-one relationship with a plurality of WOPI clients that are implemented by a respective plurality of cloud applications corresponding to a plurality of cloud storages;
    obtaining, by the WOPI abstractor, administrator configurations;
    providing, by the WOPI abstractor, the administrator configurations to the cloud storage abstractor;
    receiving, at the WOPI abstractor and from a user device of a user, a request to view the user's files that are stored in the plurality of cloud storages;
    using, by the WOPI abstractor, the administrator configurations to determine that the user is authorized to use a first cloud application of the plurality of cloud applications;
    in response to determining that the user is authorized to use the first cloud application, routing the request to a first WOPI server of the plurality of WOPI servers that corresponds with a first WOPI client implemented by the first cloud application;
    sending, by the first WOPI server and to the cloud storage abstractor, a request for a list of the user's files that are stored in the plurality of cloud storages;
    using, by the cloud storage abstractor, the administrator configurations to determine which of the plurality of cloud storages the user is authorized to use;
    obtaining, by the cloud storage abstractor, a list of the user's files from each of the plurality of cloud storages the user is authorized to use;
    receiving, at the first WOPI server, the list of the user's files;
    receiving, by the WOPI abstractor and from the first WOPI server, the list of the user's files; and
    causing, by the WOPI abstractor, the list of the user's files to be presented to the user via the user device.

2. The method of claim 1, wherein the list of the user's files is presented to the user in a webpage that is common to the first cloud application and one or more other cloud applications.

3. The method of claim 1, wherein causing the list of the user's files to be presented to the user via the user device includes providing details about the first cloud application to the user device.

4. The method of claim 1, further comprising:
    in response to the user providing input requesting to open a first file of the user's files, receiving, at the first WOPI server and from the first WOPI client, a request for information about the first file;
    obtaining, by the first WOPI server and from the cloud storage abstractor, the information about the first file, the information about the first file including a location where the first file is stored in one of the plurality of cloud storages.

5. The method of claim 4, further comprising:
    receiving, at the first WOPI server and from the first WOPI client, a request for contents of the first file;
    obtaining, by the first WOPI server and from the cloud storage abstractor, the contents of the first file.

6. The method of claim 5, further comprising:
    sending, by the first WOPI server, the contents of the first file to the first WOPI client to thereby cause the first cloud application to present the contents of the first file to the user via the user device.

7. The method of claim 1, wherein the request to view the user's files is received via a webpage that the WOPI abstractor provides.

8. The method of claim 7, further comprising:
    receiving, at the webpage, a request to open a first file of the user's files; and
    causing the request to open the first file to be directed to the first WOPI client.

9. The method of claim 8, further comprising:
    receiving, at the webpage, a request to open a second file of the user's files; and
    causing the request to open the second file to be directed to a second WOPI client implemented by a second cloud application of the plurality of cloud applications.

10. One or more computer storage media storing computer executable instructions which when executed implement a method for bridging heterogeneous sets of cloud applications and storage, the method comprising:
    establishing, by a Web Application Open Platform Interface (WOPI) abstractor, a connection with a cloud storage abstractor and with each of a plurality of WOPI servers, wherein the WOPI servers have a one-to-one relationship with a plurality of WOPI clients that are implemented by a respective plurality of cloud applications corresponding to a plurality of cloud storages;
    obtaining, by the WOPI abstractor, administrator configurations;
    providing, by the WOPI abstractor, the administrator configurations to the cloud storage abstractor;
    receiving, at the WOPI abstractor and from a user device of a user, a request to view the user's files that are stored in the plurality of cloud storages;
    using, by the WOPI abstractor, the administrator configurations to determine that the user is authorized to use a first cloud application of the plurality of cloud applications;
    in response to determining that the user is authorized to use the first cloud application, routing the request to a first WOPI server of the plurality of WOPI servers that corresponds with a first WOPI client implemented by the first cloud application;
    sending, by the first WOPI server and to the cloud storage abstractor, a request for a list of the user's files that are stored in the plurality of cloud storages;
    using, by the cloud storage abstractor, the administrator configurations to determine which of the plurality of cloud storages the user is authorized to use;

obtaining, by the cloud storage abstractor, a list of the user's files from each of the plurality of cloud storages the user is authorized to use;

receiving, at the first WOPI server, the list of the user's files;

receiving, by the WOPI abstractor and from the first WOPI server, the list of the user's files; and causing, by the WOPI abstractor, the list of the user's files to be presented to the user via the user device.

11. The computer storage media of claim 10, wherein the list of the user's files is presented to the user in a webpage that is common to the first cloud application and one or more other cloud applications.

12. The computer storage media of claim 10, wherein causing the list of the user's files to be presented to the user via the user device includes providing details about the first cloud application to the user device.

13. The computer storage media of claim 10, wherein the method further comprises:

in response to the user providing input requesting to open a first file of the user's files, receiving, at the first WOPI server and from the first WOPI client, a request for information about the first file;

obtaining, by the first WOPI server and from the cloud storage abstractor, the information about the first file, the information about the first file including a location where the first file is stored in one of the plurality of cloud storages.

14. The computer storage media of claim 13, wherein the method further comprises:

receiving, at the first WOPI server and from the first WOPI client, a request for contents of the first file;

obtaining, by the first WOPI server and from the cloud storage abstractor, the contents of the first file.

15. The computer storage media of claim 14, wherein the method further comprises:

sending, by the first WOPI server, the contents of the first file to the first WOPI client to thereby cause the first cloud application to present the contents of the first file to the user via the user device.

16. The computer storage media of claim 10, wherein the request to view the user's files is received via a webpage that the WOPI abstractor provides.

17. The computer storage media of claim 16, wherein the method further comprises:

receiving, at the webpage, a request to open a first file of the user's files; and causing the request to open the first file to be directed to the first WOPI client.

18. The computer storage media of claim 17, wherein the method further comprises:

receiving, at the webpage, a request to open a second file of the user's files; and causing the request to open the second file to be directed to a second WOPI client implemented by a second cloud application of the plurality of cloud applications.

19. A system comprising:

one or more processors; and one or more computer storage media storing computer executable instructions which when executed implement a method for bridging heterogeneous sets of cloud applications and storage, the method comprising:

establishing, by a Web Application Open Platform Interface (WOPI) abstractor, a connection with a cloud storage abstractor and with each of a plurality of WOPI servers, wherein the WOPI servers have a one-to-one relationship with a plurality of WOPI clients that are implemented by a respective plurality of cloud applications corresponding to a plurality of cloud storages;

obtaining, by the WOPI abstractor, administrator configurations;

providing, by the WOPI abstractor, the administrator configurations to the cloud storage abstractor;

receiving, at the WOPI abstractor and from a user device of a user, a request to view the user's files that are stored in the plurality of cloud storages;

using, by the WOPI abstractor, the administrator configurations to determine that the user is authorized to use a first cloud application of the plurality of cloud applications;

in response to determining that the user is authorized to use the first cloud application, routing the request to a first WOPI server of the plurality of WOPI servers that corresponds with a first WOPI client implemented by the first cloud application;

sending, by the first WOPI server and to the cloud storage abstractor, a request for a list of the user's files that are stored in the plurality of cloud storages;

using, by the cloud storage abstractor, the administrator configurations to determine which of the plurality of cloud storages the user is authorized to use;

obtaining, by the cloud storage abstractor, a list of the user's files from each of the plurality of cloud storages the user is authorized to use;

receiving, at the first WOPI server, the list of the user's files;

receiving, by the WOPI abstractor and from the first WOPI server, the list of the user's files; and causing, by the WOPI abstractor, the list of the user's files to be presented to the user via the user device.

20. The system of claim 19, wherein the list of the user's files is presented to the user in a webpage that is common to the first cloud application and one or more other cloud applications.

* * * * *